(12) United States Patent
Herke et al.

(10) Patent No.: US 10,960,784 B2
(45) Date of Patent: Mar. 30, 2021

(54) METHOD AND DEVICE FOR OPERATING CHARGING STATIONS

(71) Applicant: Dr. Ing. h.c. F. Porsche Aktiengesellschaft, Stuttgart (DE)

(72) Inventors: Dirk Herke, Kirchheim unter Teck (DE); Ralf Oestreicher, Sindelfingen (DE); Volker Reber, Michelbach an der Bilz (DE); Anja Heinzelmann, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 779 days.

(21) Appl. No.: 15/427,370

(22) Filed: Feb. 8, 2017

(65) Prior Publication Data

US 2017/0240063 A1    Aug. 24, 2017

(30) Foreign Application Priority Data

Feb. 22, 2016  (DE) .......................... 102016103011.2

(51) Int. Cl.
*H02J 7/00* (2006.01)
*B60L 53/67* (2019.01)
(Continued)

(52) U.S. Cl.
CPC .............. *B60L 53/67* (2019.02); *B60L 53/11* (2019.02); *B60L 53/22* (2019.02); *B60L 53/30* (2019.02);
(Continued)

(58) Field of Classification Search
CPC ........ H05B 47/19; H05B 45/37; Y02B 70/30; Y02B 70/10; H02J 9/02; H02J 9/065; H02J 7/34; H02J 7/345; H02J 7/0042; H02J 7/0068; H02J 7/02; H02J 7/022; H02J 2207/20; H02J 9/061; H02J 13/00006;
(Continued)

(56) References Cited

U.S. PATENT DOCUMENTS

| 5,803,215 A | 9/1998 | Henze |
| 7,135,836 B2 | 11/2006 | Kutkut |

(Continued)

FOREIGN PATENT DOCUMENTS

| CN | 102255528 A | 11/2011 |
| CN | 102891613 A | 1/2013 |

OTHER PUBLICATIONS

German Search Report for German Application No. 10 2016 103 011.2, dated Sep. 8, 2016, 11 pages, with partial English translation.
(Continued)

*Primary Examiner* — Binh C Tat
(74) *Attorney, Agent, or Firm* — RatnerPrestia

(57) ABSTRACT

A method for supplying a number of electric charging stations with electricity, wherein AC voltage provided by an electricity source is transformed into a prescribed AC voltage level by at least one transformer via at least one star winding and at least one delta winding and subsequently routed via AC voltage lines to the number of electric charging stations and converted directly to direct current in respective charging stations from the number of electric charging stations locally by at least two rectifiers of the charging stations.

12 Claims, 6 Drawing Sheets

(51) Int. Cl.
  *H02J 3/14* (2006.01)
  *H02J 3/00* (2006.01)
  *H02J 5/00* (2016.01)
  *B60L 53/22* (2019.01)
  *B60L 53/30* (2019.01)
  *B60L 53/10* (2019.01)

(52) U.S. Cl.
  CPC .................................. *H02J 3/00* (2013.01);
    *H02J 3/14* (2013.01); *H02J 5/00* (2013.01);
    *H02J 7/0068* (2013.01); *H02J 7/0027*
    (2013.01); *Y02B 70/3225* (2013.01); *Y02T*
    *10/70* (2013.01); *Y02T 10/7072* (2013.01);
    *Y02T 90/12* (2013.01); *Y02T 90/14* (2013.01);
    *Y04S 20/222* (2013.01)

(58) Field of Classification Search
  CPC .. H02J 13/00017; H02J 13/0017; H02J 50/00;
    H02J 50/10; H02J 50/40; H02J 7/0029;
    H02J 7/00306; H02J 7/00308; H02J
    7/025; H02J 3/00; H02J 7/0047; H02J
    7/0069; H02J 7/0071; H02J 7/1423; H02J
    1/10; H02J 1/108; H02J 1/12; H02J
    2300/24; H02J 2300/28; H02J 3/01; H02J
    3/18; H02J 3/32; H02J 3/381; H02J
    3/383; H02J 3/386; H02J 7/35; H02J
    2310/12; H02J 2310/48; H02J 2310/60;
    H02J 3/14; H02J 5/00; H02J 7/0013;
    H02J 7/0014; H02J 7/0024; H02J 7/0027;
    H02J 7/0031; H02J 7/00712; H02J
    7/1492; Y04S 30/12; Y02T 10/7072;
    Y02T 90/12; Y02T 10/64; Y02T 10/92;
    Y02T 90/167; B60L 2210/30; B60L
    2210/10; B60L 2210/40; B60L 53/53;
    B60L 53/60; B60L 53/66
  USPC .................................................. 320/106–115
  See application file for complete search history.

(56) References Cited

U.S. PATENT DOCUMENTS

| 2003/0102845 | A1* | 6/2003 | Aker | ..................... | H02J 7/0042 |
| | | | | | 320/139 |
| 2012/0019203 | A1 | 1/2012 | Kressner | | |
| 2012/0112693 | A1* | 5/2012 | Kusch | ..................... | B60L 58/20 |
| | | | | | 320/109 |
| 2012/0280655 | A1 | 11/2012 | Schneider et al. | | |
| 2013/0020989 | A1 | 1/2013 | Xia | | |
| 2013/0057200 | A1* | 3/2013 | Potts | ..................... | H02J 7/025 |
| | | | | | 320/107 |
| 2013/0307486 | A1 | 11/2013 | Chang | | |
| 2013/0314038 | A1* | 11/2013 | Kardolus | ..................... | B60L 53/20 |
| | | | | | 320/109 |
| 2014/0035530 | A1 | 2/2014 | Zehua Shao | | |
| 2014/0340041 | A1* | 11/2014 | Aggeler | ..................... | B60L 53/30 |
| | | | | | 320/109 |

OTHER PUBLICATIONS

English translation of the Chinese Office Action for Chinese Application No. 2017100871203, dated Jun. 21, 2019, 9 pages.
Chinese Office Action for Chinese Application No. 2017100871203, dated Sep. 3, 2020, 15 pages.
Xin Lin, "Harmonic Analysis of Electric Vehicle Charging Stations," Electrical Switch, No. 6, Jun. 30, 2015, 4 pages (English abstract only).

\* cited by examiner

METHOD AND DEVICE FOR OPERATING CHARGING STATIONS

CROSS-REFERENCE TO RELATED APPLICATION

This application claims priority to German Patent Application No. DE 10 2016 103 011.2, filed Feb. 22, 2016, which is incorporated by reference herein in its entirety.

FIELD OF THE INVENTION

Described herein is a method for supplying a number of electric charging stations with electricity and to a charging station arrangement and a transformation device.

BACKGROUND OF THE INVENTION

The supply of electric loads, such as charging stations for vehicles, for example, with electricity in the form of AC voltage normally entails a reactive power on account of phase shifts. In order to assess a quality factor for a transmission of electric power to an electric load, a ratio of reactive power to active power of the electric load is taken as a basis for ascertaining a power factor.

There is therefore a need for methods for supplying charging stations with as high as possible a power factor.

U.S. Pat. No. 5,803,215 A, which is incorporated by reference herein, presents a system for transmitting direct and/or alternating current to a charging station.

US 2012 280 655 A1, which is incorporated by reference herein, discloses a charging station for vehicles that involves arriving AC voltage being converted into DC voltage by means of an output stage and an AC/DC converter.

An AC/DC converter is disclosed in US 2013 020 989 A1, which is incorporated by reference herein.

US 2013 307 486 A1, which is incorporated by reference herein, reveals a charging system that comprises a number of primary windings and a number of secondary windings.

A charging system for charging electric batteries by means of charging modules connected via a CAN bus is disclosed in the US 2014 035 530 A1, which is incorporated by reference herein.

SUMMARY OF THE INVENTION

Against this background, described herein is a method for supplying charging stations with electricity that allows active power factor correction to be dispensed with.

Therefore, a method for supplying a number of electric charging stations with electricity is presented, wherein AC voltage provided by an electricity source is transformed into a prescribed AC voltage level by means of at least one transformer via at least one star winding and at least one delta winding and subsequently routed via AC voltage lines to the number of electric charging stations and converted directly into direct current in respective charging stations from the number of electric charging stations locally by means of at least two rectifiers that a respective charging station comprises.

The presented method is used particularly to optimize respective power factors of a number of charging stations for supplying a vehicle with electricity. In this regard, the disclosure provides for a respective charging station to be supplied with power by virtue of arriving electricity in the form of AC voltage being first transformed by means of at least one transformer and subsequently routed via AC voltage lines, such as AC bus, tree or ring, for example, to a respective charging column and converted there locally into direct current. In order to minimize power losses, there is provision for the at least one transformer to comprise at least one delta winding and at least one star winding that are energized uniformly, so that a control phase offset and, as a result, a reduction in harmonics occurs, which increases the power factor of a charging station supplied with power in this manner in comparison with the prior art, particularly in comparison with solutions based on intermediate transformers, which have an adverse effect on a power factor.

Within the context of this disclosure, direct conversion or direct forwarding of electricity is intended to be understood to mean a process in which electricity is converted by a respective switching element, such as a rectifier, for example, or supplied to a respective switching element directly, i.e. without intermediate elements, such as power factor correction filters, for example.

Naturally, it is conceivable for the delta and star windings provided according to the disclosure, i.e. the resistors connected in a delta circuit or a star circuit, to be arranged collectively in one transformer or in a manner distributed over a variety of transformers.

In one possible embodiment of the presented method, respective charging stations from the number of electric charging stations comprise at least two 6-pulse rectifiers and at least one DC isolating DC/DC converter.

The DC isolating or isolated DC/DC converters ensure DC isolation between a respective power supply system, i.e. an AC supply system, and a respective vehicle to be charged and also between respective DC isolated vehicles themselves.

In particular, respective star or delta windings supply a number of charging stations, particularly at least two charging stations, which each comprise at least two 3-phase rectifiers, such as 6-pulse rectifiers, for example, and at least one DC/DC converter, particularly a DC isolating DC/DC converter, with electricity.

In a further possible embodiment of the presented method, the supply of the number of electric charging stations with electricity involves the performance of load management by means of which a total power of the number of electric charging stations is limited to a maximum power of the at least one transformer.

In order to protect the at least one transformer provided against overload, it is possible, for example on a controller for monitoring a respective charging process, to perform load management that limits a total power of respective charging stations supplied with electricity by the at least one transformer to a maximum power of the transformer. The load management can supply respective charging stations with electricity up to the maximum power of the transformer in accordance with a prescribed rule, such as a "first come first served" principle, for example, or a prioritization list.

Use of the at least one transformer, provided, with at least one star and/or delta winding each allows, in contrast to a three phase transformer that is usually used, active power factor correction to be dispensed with. As an alternative to active power factor correction by means of an output stage, the presented method provides for the use of two 6-pulse rectifiers per charging station that convert AC voltage transformed by the transformer into direct current locally for the respective charging station.

In a further possible embodiment of the presented method, the at least one transformer comprises, in addition to the at least one star winding and the at least one delta winding, at least one further winding, particularly a zig-zag winding, by means of which a number of phase-offset phases is increased and a power factor of respective charging stations from the number of electric charging stations is increased.

If a winding, such as a zig-zag winding, for example, in addition to the at least one star winding and the at least one delta winding is provided on the at least one transformer according to the disclosure, then, in particular, further rectifiers that are electrically connected to a respective additional winding by corresponding AC lines are provided in respective charging stations in accordance with a number of additional windings. In a further possible embodiment of the presented method, respective secondary windings of the at least one transformer are operated in grounded or ungrounded fashion.

Within the context of the presented disclosure, a secondary winding is intended to be understood to mean a winding in addition to the at least one star winding and the at least one delta winding, for example.

In a further possible embodiment of the presented method, a total power of the number of electric charging stations is built up gradually by means of a multiplicity of transformers that supply the number of electric charging stations in a parallel circuit with electricity. In this case, a respective AC bus for supplying power to the number of electric charging stations is supplied with power by multiple transformers in parallel.

Gradual or temporally successive buildup of power in different charging stations allows voltage spikes and corresponding wear and tear to be reduced. For the gradual switching of respective transformers, the transformers can be connected or disconnected by a circuit. Accordingly, a charging station arrangement operated by means of the presented method can, even after startup, be simply and quickly extended by virtue of parallel arrangement of further transformers and charging stations.

In a further possible embodiment of the presented method, the at least two rectifiers of a respective charging station are arranged in parallel, in series or in a manner switchable between a series and a parallel arrangement.

Parallel connection of respective rectifiers allows two intermediate circuit voltages differing by a factor of "2" to be able to be represented in a corresponding charging station, which doubles an output current range of DC/DC converter of the charging station.

A series connection of respective rectifiers allows two intermediate circuit voltages differing by a factor of "2" to be able to be represented in a respective charging station, which halves a conversion range of a DC/DC converter of the charging station, so that an efficiency of the DC/DC converter increases.

Connection of respective rectifiers of a charging station that is switchable between parallel connection and series connection allows an output current range of a DC/DC converter of the charging station to be doubled or a conversion range of a DC/DC converter of the charging station to be halved, depending on requirements, so that, for example, vehicles can be supplied with 400 volt and 800 volt battery voltages independently.

In a further possible embodiment of the presented method, the DC isolating DC/DC converters of a multiplicity of charging stations from a number of electric charging stations are electrically connected so as to be switchable between parallel and series arrangement, and the DC/DC converters of the multiplicity of charging stations from the number of electric charging stations are interconnected in parallel or in series in order to alter a collective output voltage or collective output current of the charging stations interconnected by means of the DC/DC converters.

Interconnection of respective charging stations via a connection between respective DC/DC converters at the respective charging stations allows a very large current and/or a very high voltage to be provided quickly and simply when required.

Further, the present disclosure relates to a transformation device for supplying a number of charging stations with electricity, wherein the transformation device comprises at least one transformer, and the at least one transformer is set up to use a delta winding and a star winding to transform AC voltage arriving on the at least one transformer into a prescribed voltage level and to route said voltage level via AC voltage lines directly to respective rectifiers of the charging stations from the number of charging stations.

The presented transformation device is used particularly for performing the presented method.

Further, the present disclosure relates to a charging station arrangement having a number of charging stations and a transformation device for supplying the number of charging stations with electricity, wherein the transformation device comprises at least one transformer, and the at least one transformer is set up to use a delta winding and a star winding to transform AC voltage arriving on the at least one transformer into a prescribed voltage level and to route said voltage level via AC voltage lines to respective charging stations from the number of charging stations, and wherein respective charging stations from the number of charging stations comprise at least two rectifiers that can each be supplied directly with electricity by the at least one transformer.

The presented charging station arrangement is used particularly for performing the presented method.

In one possible embodiment of the presented charging station arrangement, the charging station arrangement comprises a number of charging stations and respective charging stations from the number of charging stations each comprise a DC/DC converter, and wherein the DC/DC converters of at least two charging stations from the number of charging stations are electrically connected via a circuit, and wherein the circuit is embodied such that the DC/DC converters of the at least two charging stations from the number of charging stations can be connected in parallel or in series with one another in order to supply power to a charging point for a vehicle.

A parallel or series interconnection of respective DC/DC converters of respective charging stations allows a number of charging stations, particularly two charging stations, to be interconnected, so that the number of charging stations supply a central charging point with electric power. Parallel connection of respective DC/DC converters, wherein the DC/DC converters may be present particularly in a manner distributed over a multiplicity of charging stations, allows variation and adjustment of corresponding output currents. Series connection of respective DC/DC converters, wherein the DC/DC converters may be present particularly in a manner distributed over a multiplicity of charging stations, allows variable adjustment of a corresponding output voltage. When two converters are used for a charging station for a vehicle, a voltage between rectifier and converter can remain distinctly below U=1000 V, for example. Respective DC/DC converters can be embodied either in DC isolated fashion or in non-DC isolated fashion depending on respective requirements of the respective DC/DC converters.

Further advantages and embodiments are obtained from the description and the accompanying drawings.

It goes without saying that the features cited above and those yet to be explained below can be used not only in the respectively indicated combination but also in other combinations or on their own without departing from the scope of the present invention.

The invention is presented schematically in the drawings on the basis of embodiments and is described schematically in detail with reference to the drawings.

DETAILED DESCRIPTION OF THE INVENTION

Figure 1:
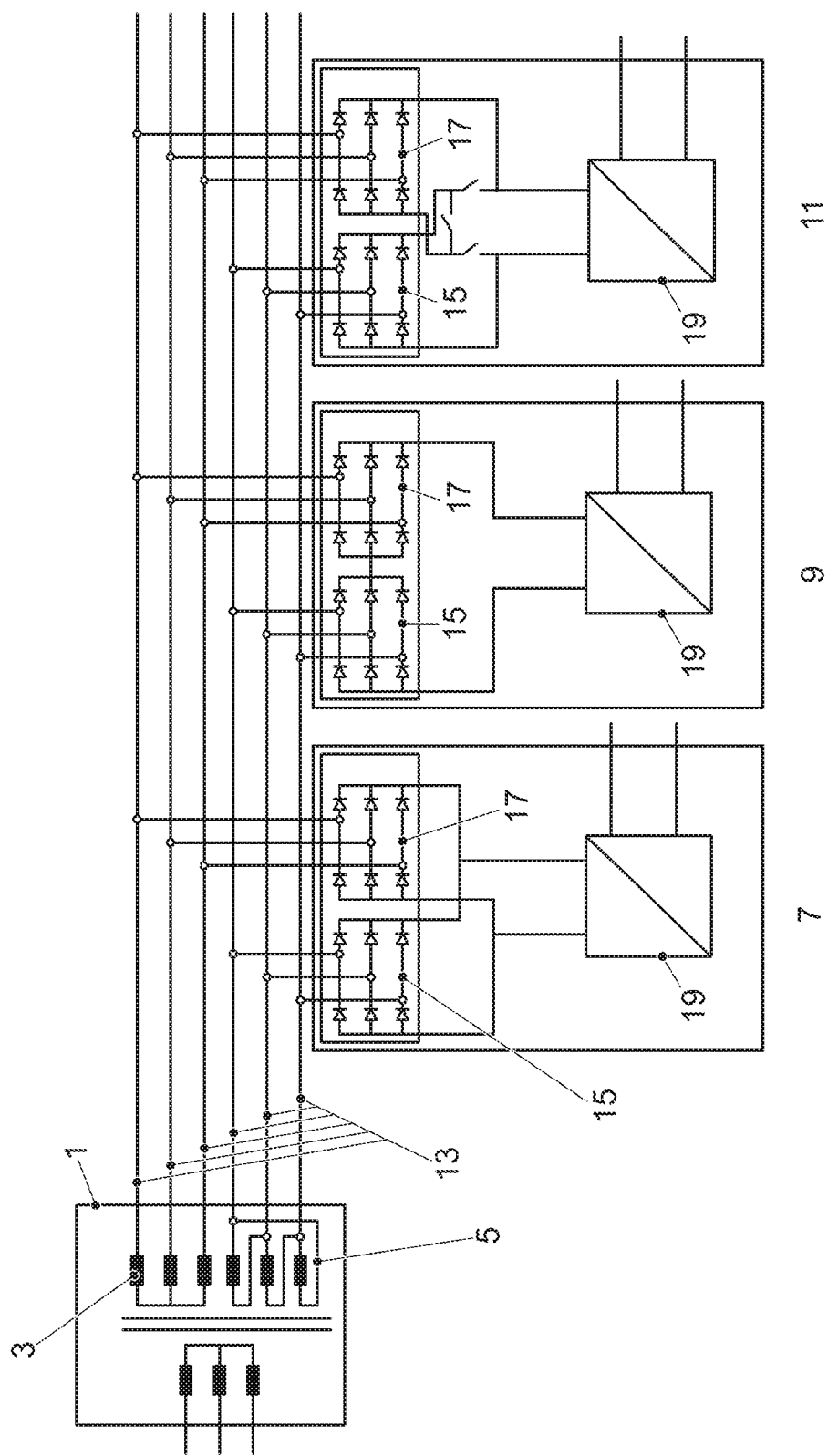
FIG. 1 depicts a schematic representation of a possible embodiment of the presented charging station arrangement.

FIG. 1 shows a transformer 1 that comprises a star winding 3 and a delta winding 5. To supply respective charging stations 7, 9 and 11 with electricity, an AC voltage arriving on the transformer is first transformed into a prescribed voltage level by the transformer 1 by means of the star winding 3 and the delta winding 5 and subsequently transmitted to the charging stations 7, 9 and 11 via a 6-phase bus 13.

The charging stations 7, 9 and 11 each comprise two rectifiers 15 and 17, of which, respectively, a rectifier 17 is in electrical contact with the star winding 3 and a rectifier 15 is in electrical contact with the delta winding 5.

Direct current converted by means of the rectifiers 15 and 17 is routed from the rectifiers 15 and 17 within a respective charging station 7, 9 and 11 to a DC/DC converter 19 that converts the direct current to a prescribed voltage level and makes said voltage level available for charging an end user, such as a motor vehicle, for example.

In charging station 7, the rectifiers 15 and 17 are connected in parallel. The effect achieved by this is that two intermediate circuit voltages differing by a factor of "2" can be represented in the charging station 7, which doubles an output current range of the DC/DC converter 19.

In charging station 9, the rectifiers 15 and 17 are connected in series. The effect achieved by this is that two intermediate circuit voltages differing by a factor of "2" can be represented in the charging station 9, which halves a conversion range of a DC/DC converter 19, so that an efficiency of a DC/DC converter 19 increases.

In charging station 11, the rectifiers 15 and 17 are interconnected such that it is possible to choose between a parallel and a series connection, so that, depending on the requirement, the output current range of the DC/DC converter 19 is doubled or the conversion range of the DC/DC converter 19 is halved and, by way of example, vehicles can be supplied with 400 volt and 800 volt battery voltages in parallel.

Figure 2:
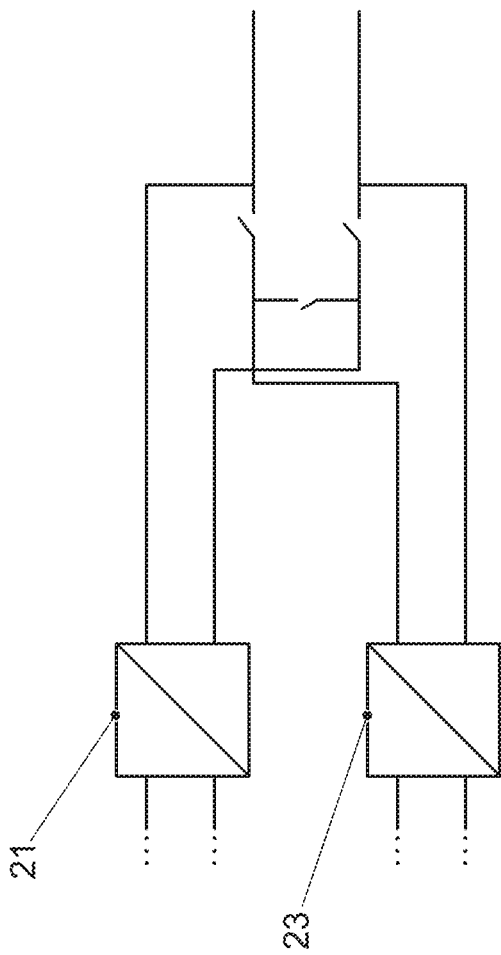
FIG. 2 depicts a schematic representation of an interconnection of two DC/DC converters of different charging stations.

FIG. 2 shows a DC/DC converter 21 of a first charging station and a DC/DC converter 23 of a second charging station. The DC/DC converter 21 is electrically connected to the DC/DC converter 23 such that it is possible to choose between a parallel and a series arrangement of the DC/DC converters 21 and 23.

Series connection of the DC/DC converters 21 and 23 allows an output voltage of the connected first and second charging stations to be adjusted variably, whereas parallel connection allows an output current to be adjusted variably.

Figure 3:
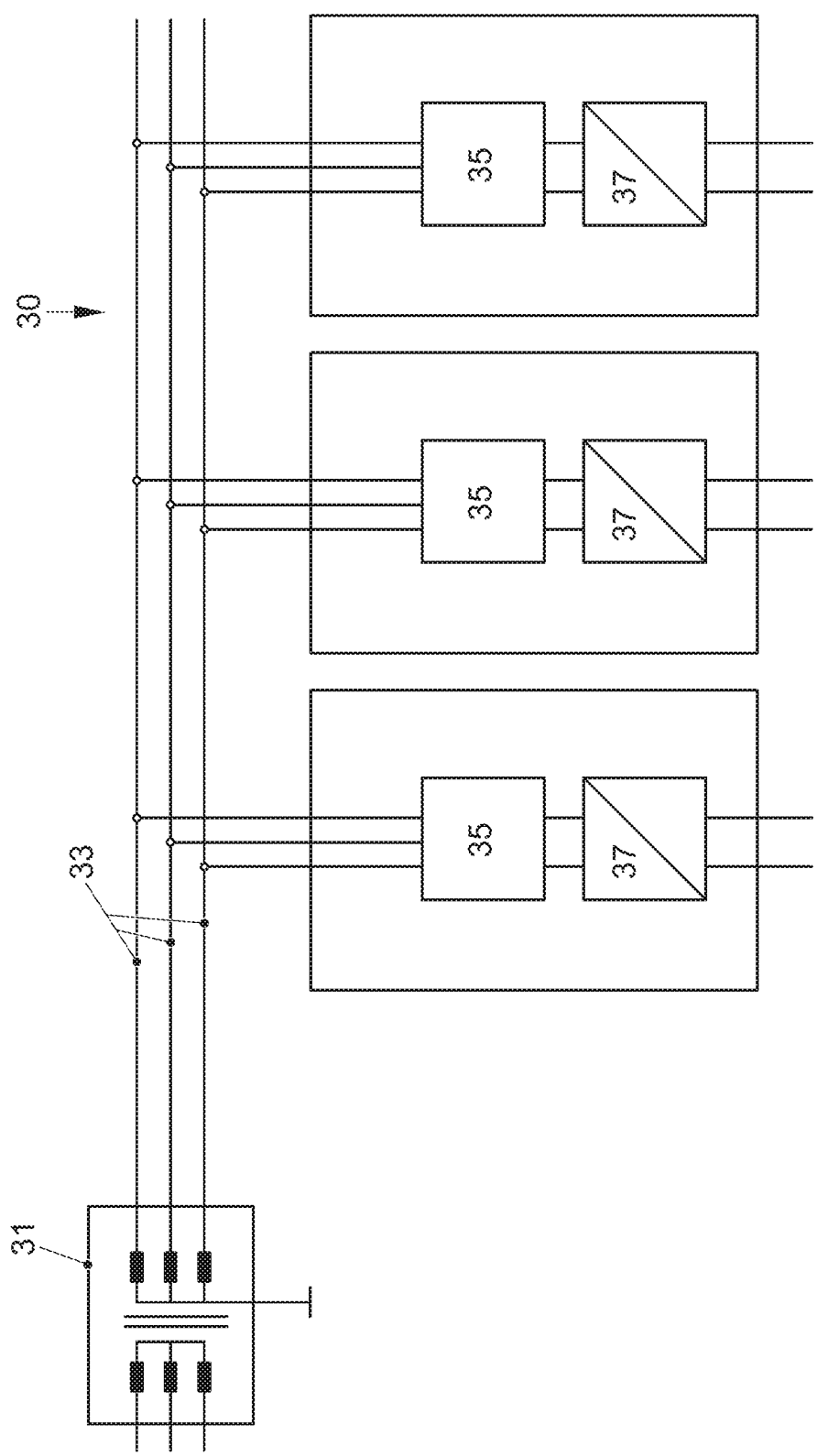
FIG. 3 depicts a charging station arrangement based on the prior art.

FIG. 3 depicts a circuit 30 based on the prior art. A transformer 31 uses an AC bus 33 to supply power to DC/DC converters 37 of respective charging stations. In order to optimize the voltage that is output by the transformer 31 for an optimum power factor, rectifiers 35 equipped with power factor correction or a power factor correction filter are connected between transformer 31 and respective DC/DC converter 37.

Figure 4:
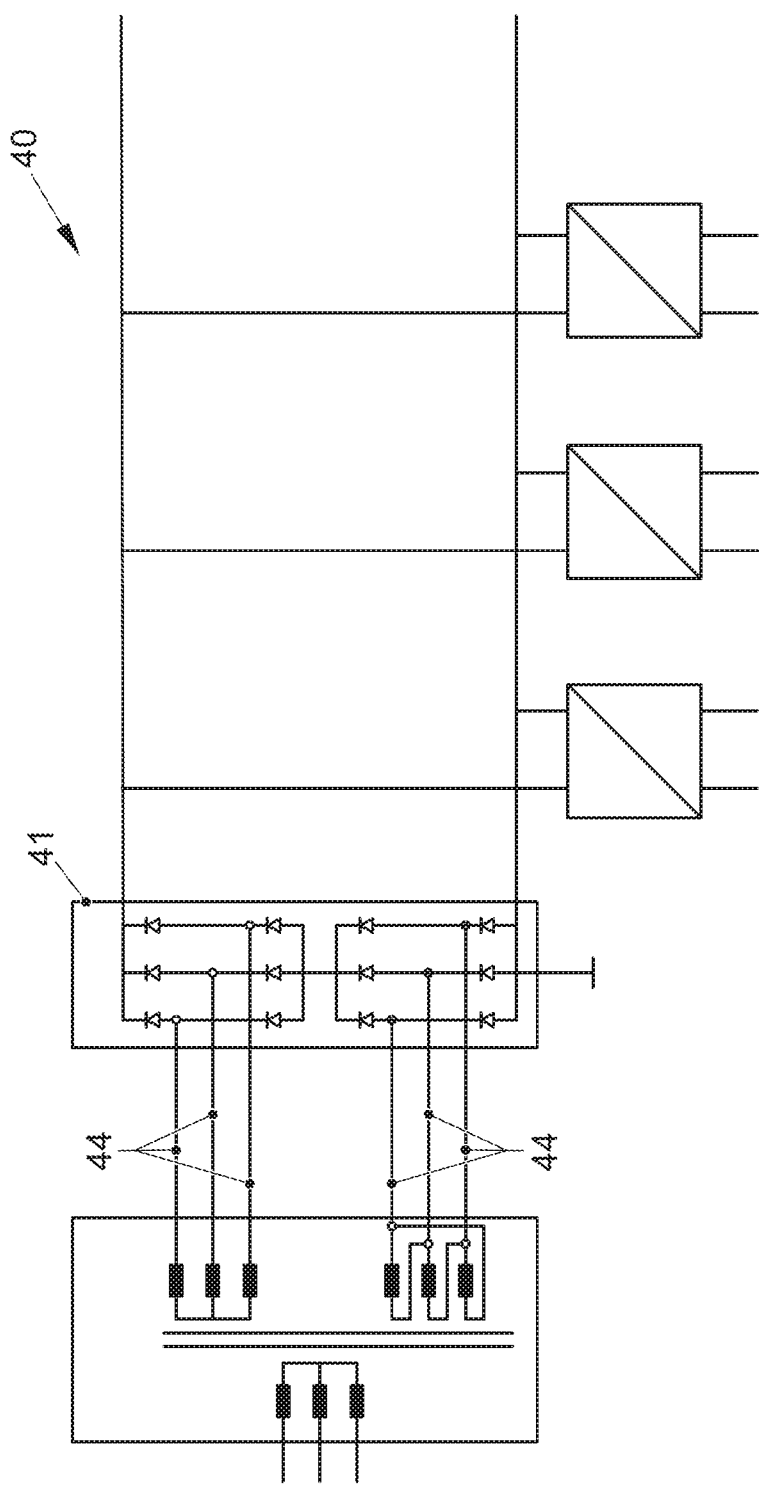
FIG. 4 depicts a further charging station arrangement based on the prior art.

FIG. 4 depicts a circuit 40 having a central rectifier 41 and a DC bus 44. In contrast to the charging station arrangement shown in FIG. 1, use of the circuit 40 requires protective elements for transmitting electric power via the DC bus 44, such as circuit breakers and overvoltage protection devices, for example.

Figure 5:
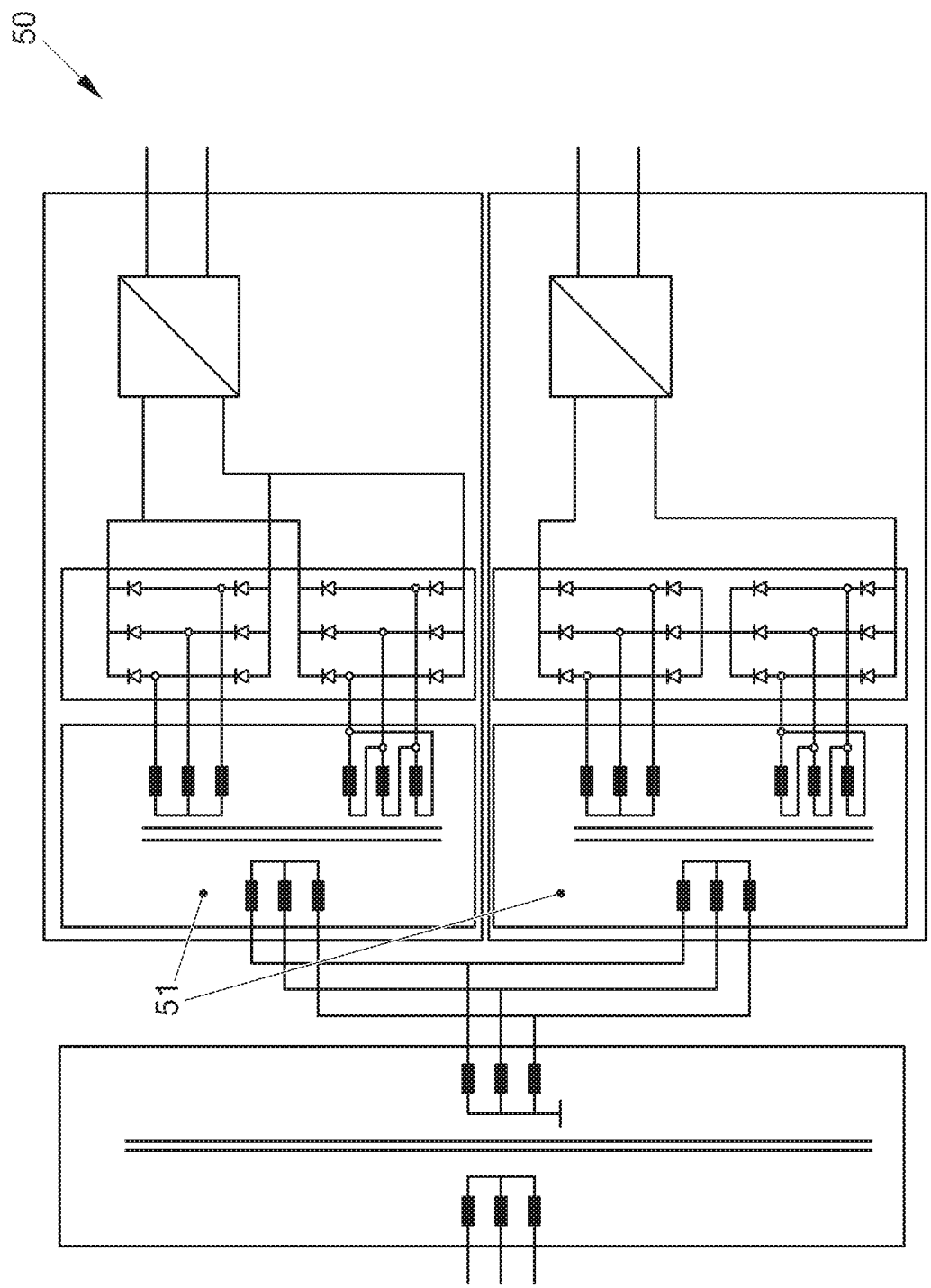
FIG. 5 depicts yet a further charging station arrangement based on the prior art.

FIG. 5 depicts a circuit 50 that is based on an isolating transformer 51. In contrast to the circuit 50, the presented method allows DC isolation by a transformer, which is operated at high frequency and therefore compact, in a DC/DC converter, so that it is possible to dispense with the 50/60 Hz isolating transformer 51 upstream of a rectifier at a respective charging station. The respective charging stations can be embodied more compactly as a result of the presented method than would be possible on the basis of the circuit 50. In addition, use of the presented method avoids no-load losses in the isolating transformer 51.

Figure 6:
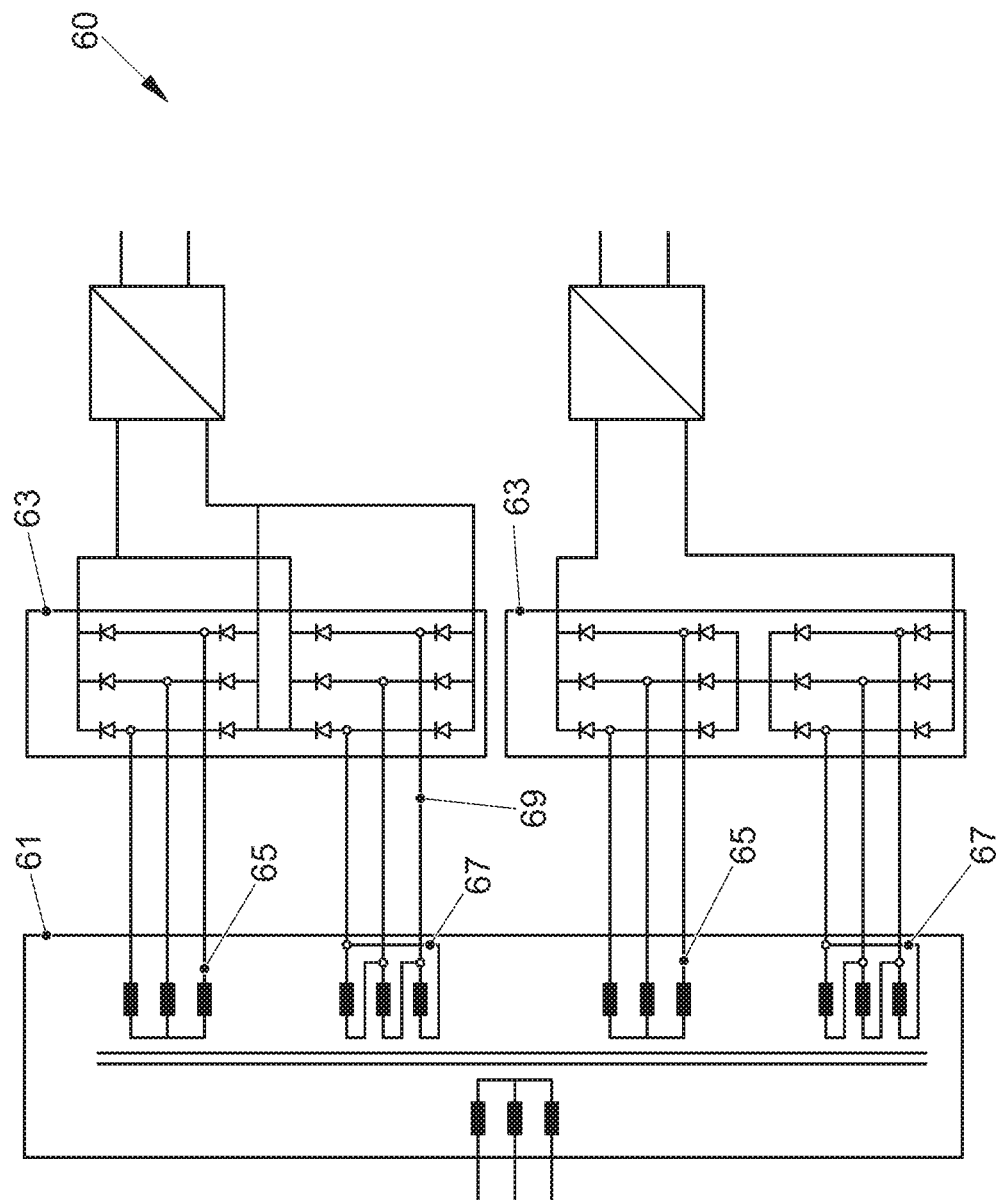
FIG. 6 depicts a further charging station arrangement based on the prior art.

FIG. 6 depicts a circuit 60 that comprises a transformer 61 that comprises in each case a star winding 65 and a delta winding 67 for supplying power to a charging station 63. In contrast to the circuit 60, the presented method provides for respective star and delta windings to be used for multiple charging stations, as a result of which a corresponding circuit may be embodied more compactly and more cheaply on the basis of the presented method than the circuit 60. In addition, the presented method allows a reduction in wiring complexity in comparison with the circuit 60, since a connecting line 69 between transformer and charging stations does not have to be routed in a star, but rather may be embodied as a bus, tree or ring distribution, for example.

What is claimed is:

1. A method for supplying a plurality of electric charging stations with electricity comprising:
    transforming alternating current (AC) voltage provided by an electricity source into a prescribed AC voltage level via at least one star winding and at least one delta winding of at least one transformer;
    subsequently routing, from the at least one transformer, the prescribed AC voltage via AC voltage lines to the plurality of electric charging stations; and
    converting the prescribed AC voltage directly, without an intermediate power factor correction filter, to direct current (DC) locally by at least two 6-pulse rectifiers of a respective electric charging station of the plurality of electric charging stations.

2. The method as claimed in claim 1, wherein:
    each respective electric charging station of the plurality of electric charging stations further comprises at least one DC isolating DC/DC converter.

3. The method as claimed in claim 2, wherein:
the at least one DC isolating DC/DC converter of each of the plurality of charging stations are electrically connected so as to be switchable between parallel and series arrangement, and the at least one DC isolating DC/DC converter of each of the plurality of the charging stations are interconnected in parallel or in series in order to alter a common output voltage or a common output current of the plurality of electric charging stations interconnected by the at least one DC isolating DC/DC converter.

4. The method as claimed in claim 1, wherein:
transforming the AC voltage provided by an electricity source into the prescribed AC voltage level further includes performing load management to limit a total power of the plurality of electric charging stations to a maximum power of the at least one transformer.

5. The method as claimed in claim 1, further comprising:
operating a respective secondary winding of the at least one transformer in a grounded or ungrounded fashion.

6. The method as claimed in claim 1, further comprising:
gradually building up a total power of the plurality of electric charging stations by a multiplicity of transformers in a parallel circuit that supply the plurality of electric charging stations with the routed prescribed AC voltage .

7. The method as claimed in claim 1, wherein the at least two 6-pulse rectifiers of each respective electric charging station are arranged in parallel, in series, or in a manner switchable between a series and a parallel arrangement.

8. A system comprising:
a transformer including at least one star winding and at least one delta winding to transform alternating current (AC) voltage provided by an electricity source into a prescribed AC voltage level; and
a plurality of electric charging stations, each respective charging station including at least two respective 6-pulse rectifiers to convert the prescribed AC voltage directly, without an intermediate power factor correction filter, to direct current (DC) locally.

9. The system of claim 8, wherein:
each respective electric charging station further comprises at least one DC isolating DC/DC converter.

10. The system of claim 9, wherein:
the at least one DC isolating DC/DC converter of each of the plurality of charging stations are electrically connected so as to be switchable between parallel and series arrangement; and
the at least one DC isolating DC/DC converter of each of the plurality of the charging stations are interconnected in parallel or in series in order to alter a common output voltage or a common output current of the plurality of electric charging stations interconnected by the at least one DC isolating DC/DC converter.

11. The system of claim 8, wherein:
the at least one transformer includes a respective secondary winding and operates the respective second winding in a grounded or ungrounded fashion.

12. The system of claim 8, wherein the at least two respective 6-pulse rectifiers of each respective electric charging station are arranged in parallel, in series, or in a manner switchable between a series and a parallel arrangement.

* * * * *